United States Patent
Boutcher et al.

(10) Patent No.: US 8,615,465 B2
(45) Date of Patent: Dec. 24, 2013

(54) REAL-TIME SECURITY VERIFICATION FOR BANKING CARDS

(75) Inventors: David C. Boutcher, Rochester, MN (US); Raymond K. Harney, Rochester, MN (US); Steven J. Munroe, Rochester, MN (US); Jeffrey J. Scheel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 12/168,964

(22) Filed: Jul. 8, 2008

(65) Prior Publication Data

US 2010/0006641 A1    Jan. 14, 2010

(51) Int. Cl.
*G06Q 40/00* (2012.01)
(52) U.S. Cl.
USPC .......................................................... 705/39
(58) Field of Classification Search
USPC .......................................................... 705/39
See application file for complete search history.

(56) References Cited

U.S. PATENT DOCUMENTS

| | | | |
|---|---|---|---|
| 6,612,488 B2 | 9/2003 | Suzuki | |
| 7,003,497 B2 | 2/2006 | Maes | |
| 7,594,605 B2 | 9/2009 | Aaron et al. | |
| 2002/0035539 A1* | 3/2002 | O'Connell | 705/39 |
| 2003/0144952 A1 | 7/2003 | Brown et al. | |
| 2004/0177040 A1 | 9/2004 | Shiu | |
| 2004/0254868 A1* | 12/2004 | Kirkland et al. | 705/35 |
| 2004/0255081 A1* | 12/2004 | Arnouse | 711/115 |
| 2006/0063980 A1* | 3/2006 | Hwang et al. | 600/300 |
| 2007/0046430 A1* | 3/2007 | Yamazaki et al. | 340/10.1 |
| 2007/0055785 A1* | 3/2007 | Stevens | 709/229 |
| 2008/0035725 A1 | 2/2008 | Jambunathan et al. | |
| 2008/0128513 A1* | 6/2008 | Hammad et al. | 235/492 |
| 2010/0006641 A1 | 1/2010 | Boutcher et al. | |

OTHER PUBLICATIONS

U.S. Patent Application entitled "Real-Time Security Verification For Banking Cards" by David C. Boutcher et al.
Cell phone takes security to new heights: New phone comes with security card about the size of a movie-ticket stub, Wireless on NBCNEWS.com, Oct. 27, 2006, <http://www.nbcnews.com/id/15444447/#.UgFYoZ13uKE>.

* cited by examiner

*Primary Examiner* — Jessica Lemieux
(74) *Attorney, Agent, or Firm* — Patterson & Sheridan, LLP

(57) ABSTRACT

Embodiments of the invention provide a means for verifying that a person using a bank card at a point-of-sale merchant location is in fact a person authorized to use the bank card. In one embodiment of the invention, verification may involve communicating with the mobile device 103 associated with the person authorized to use the bank card. The person authorized to use the bank card may be required to send verification data to the bank card verification system via the mobile device to confirm a purchase. The bank card verification system may not authorize the purchase if the proper verification data is not received from the mobile device. In another embodiment, the bank card verification system may be configured to determine a proximity of the mobile device to the merchant point-of-sale location to verify the purchase.

21 Claims, 6 Drawing Sheets

REAL-TIME SECURITY VERIFICATION FOR BANKING CARDS

CROSS-REFERENCE TO RELATED APPLICATIONS

This application is related to U.S. patent application Ser. No. 12/168,970, entitled REAL-TIME SECURITY VERIFICATION FOR BANKING CARDS, filed Jul. 8, 2008, by David C. Boutcher et al. This related patent application is herein incorporated by reference in its entirety.

BACKGROUND OF THE INVENTION

1. Field of the Invention

The present invention is generally related to preventing fraudulent use of banking cards, and more specifically to verifying identities of persons using banking cards.

2. Description of the Related Art

In recent years, banking cards (or bank cards) such as credit cards, debit cards, ATM cards, and the like have almost eliminated the need for carrying cash on one's person. Most merchants today accept payments made by a banking card. Therefore, most consumers find it very convenient to carry a small plastic card in a wallet or a purse instead of large amounts of cash. Furthermore, unlike cash, if a banking card is lost or destroyed, the card can easily be replaced without any significant financial loss to the owner of the card.

However, the increasing popularity of banking cards has also lead to an increase in identity theft and banking card fraud. Identity thieves continue to use stolen banking cards and banking card account numbers to make unauthorized purchases which may result in great financial loss to true owners of the banking cards, to financial institutions offering the banking cards or to merchants that accept the banking card payments. The cost of credit card fraud alone in the United States in 2007 is expected to be over three billion dollars.

SUMMARY OF THE INVENTION

The present invention is generally related to preventing fraudulent use of banking cards, and more specifically to verifying identities of persons using banking cards.

One embodiment of the invention provides a method for authorizing purchases made with a bank card using a mobile device. The method generally comprises receiving a request for a security response, wherein the request is received in response to an attempt to use the bank card to complete a purchase. The method further comprises, in response to the request for a security response, determining whether the bank card is within a predefined distance from the mobile device, providing a first security response to authorize the purchase upon determining that the bank card is within the predefined distance from the mobile device, and providing a second security response to reject the purchase upon determining that the bank card is not within the predefined distance from the mobile device.

Another embodiment of the invention provides a computer readable storage medium comprising a program product, which, when executed by a processor is configured to perform an operation for authorizing purchases made with a bank card using a mobile device. The operation generally comprises receiving a request for a security response, wherein the request is received in response to an attempt to use the bank card to complete a purchase. The operation further comprises, in response to the request for a security response, determining whether the bank card is within a predefined distance from the mobile device, providing a first security response to authorize the purchase upon determining that the bank card is within the predefined distance from the mobile device, and providing a second security response to reject the purchase upon determining that the bank card is not within the predefined distance from the mobile device.

Yet another embodiment of the invention provides a system, generally comprising at least one server, and at least one mobile device associated with a person authorized to use a bank card, wherein the mobile device is configured to receive a request for a security response from the server, wherein the request is received in response to an attempt to use the bank card to complete a purchase. In response to the request for the security response, the mobile device is configured to determine whether the bank card is within a predefined distance from the mobile device, provide a first security response to the server to authorize the purchase upon determining that the bank card is within the predefined distance from the mobile device, and provide a second security response to the server to reject the purchase upon determining that the bank card is not within the predefined distance from the mobile device.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
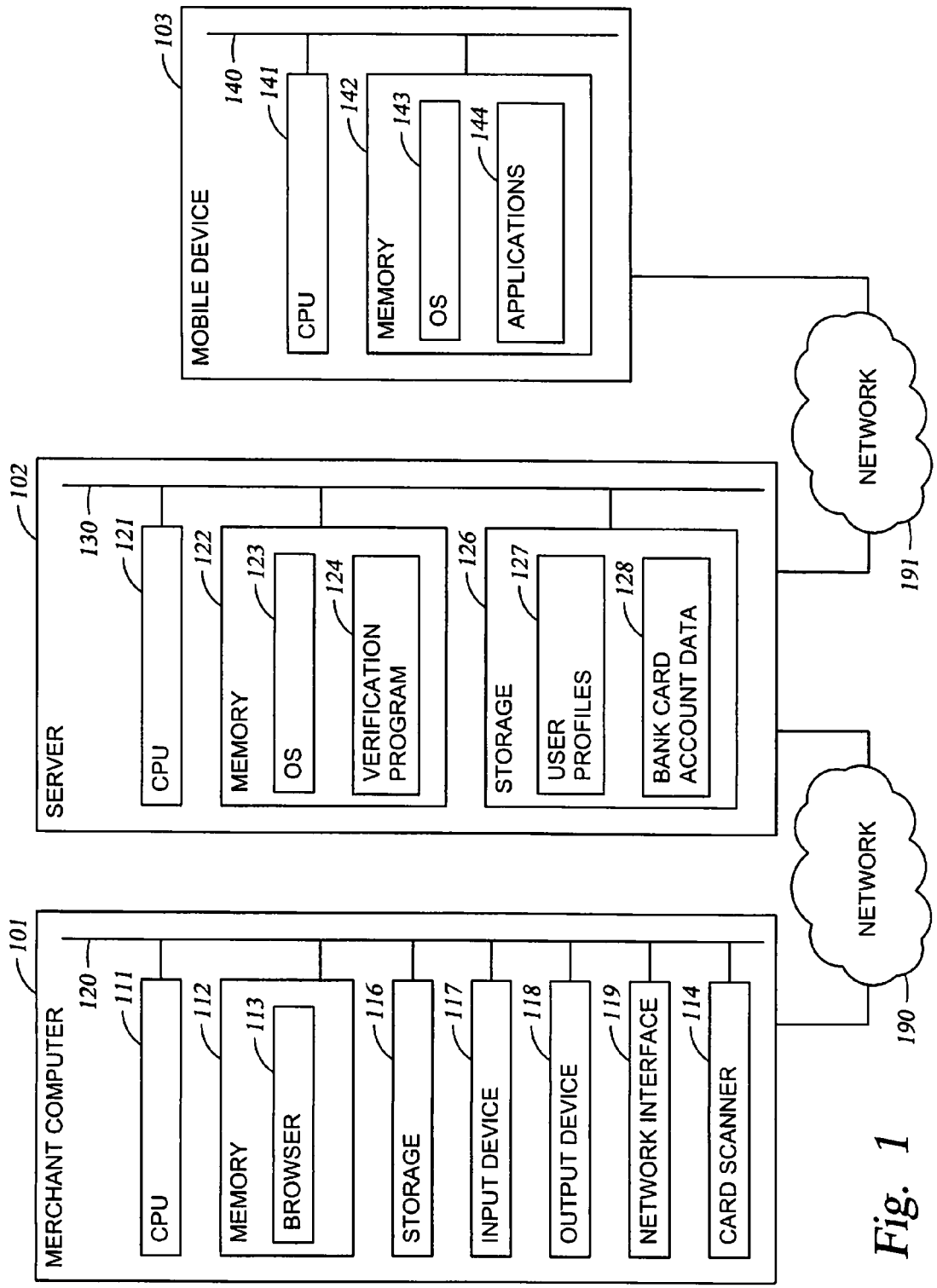
FIG. 1 illustrates an exemplary system according to an embodiment of the invention.

Embodiments of the invention provide a means for verifying that a person using a bank card at a point-of-sale merchant location is in fact a person authorized to use the bank card. In one embodiment of the invention, verification may involve communicating with the mobile device 103 associated with the person authorized to use the bank card. The person authorized to use the bank card may be required to send verification data to the bank card verification system via the mobile device to confirm a purchase. The bank card verification system may not authorize the purchase if the proper verification data is not received from the mobile device. In another embodiment, the bank card verification system may be configured to determine a proximity of the mobile device to the merchant point-of-sale location to verify the purchase.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Exemplary System

FIG. 1 depicts a block diagram of a networked system 100 in which embodiments of the invention may be implemented. In general, the networked system 100 includes at least one merchant computer 101, at least one server 102, and at least one mobile device 103. The merchant computer 101 and server 102 may be connected via a network 190. In general, the network 190 may be a local area network (LAN), a metropolitan area network (MAN), a wide area network (WAN), the Internet, or the like. In a particular embodiment, the network 190 is a telephone network.

The mobile device 103 may be connected to the server 102 via a network 191. Network 191 may also be any one of a local area network (LAN), a metropolitan area network (MAN), a wide area network (WAN), the Internet, or the like. In a particular embodiment, the network 191 may be a wireless cellular phone network. While the networks 190 and 191 are shown separately in FIG. 1, in alternative embodiments, the merchant computer 101, server 102, and mobile device 103 may be coupled with a common network to facilitate communication between the devices. Furthermore, the networks 190 and 191 need not be homogenous networks. In some embodiments, the networks 190 and 191 may include any combination of one or more networks, for example, wireless networks, wired networks, LANs, MANs, WANs, and the like.

Merchant computer 101 may be a point-of-sale computer located, for example, at a store or other business location operated by a merchant. The merchant computer 101 may be used by the merchant to process payments for goods and/or services sold by the merchant to consumers. Accordingly, the merchant computer 101 may be configured to scan bank cards such as, for example, credit cards and debit cards to receive electronic payments from consumers.

The merchant computer 101 may include a Central Processing Unit (CPU) 111 connected via a bus 120 to a memory 112, card scanner 114, storage 116, an input device 117, an output device 118, and a network interface device 119. The input device 117 can be any device to give input to the merchant computer 101. For example, a keyboard, keypad, light-pen, touch-screen, track-ball, or speech recognition unit, audio/video player, and the like could be used. The output device 118 can be any device to give output to the user, e.g., any conventional display screen. Although shown separately from the input device 117, the output device 118 and input device 117 could be combined. For example, a display screen with an integrated touch-screen, a display with an integrated keyboard, or a speech recognition unit combined with a text speech converter could be used.

The network interface device 119 may be any entry/exit device configured to allow network communications between a merchant computer 101 and server 102 via the network 190. For example, the network interface device 119 may be a network adapter or other network interface card (NIC). In one embodiment of the invention, the network interface device 119 may be configured to access the Internet. In a particular embodiment, the merchant computer 101 may host a website that allows customers to make online purchases.

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 may include a browser program 114 which, when executed by CPU 111, provides support for displaying data received from server 102. In one embodiment, browser program 114 may include a web-based Graphical User Interface (GUI), which allows the user to display Hyper Text Markup Language (HTML) information. More generally, however, the browser program 114 may be a GUI-based program capable of rendering any information transferred from server 102. In a particular embodiment, browser program 114 may be configured to display transaction data of purchases made by consumers. For example, the browser program may be configured to display items purchased by a particular consumer in a given transaction, a price of each item purchase, a total purchase price, and the like.

Card scanner 114 may be any device capable of reading information stored on a magnetic stripe card. A magnetic stripe card is a type of card capable of storing data by modifying the magnetism of tiny iron-based magnetic particles on a band of magnetic material on the card. The magnetic stripe may be read by physical contact and swiping past a reading head of the card scanner 114. In a particular embodiment of the invention, card scanner 114 may be capable of reading a magnetic stripe of a bank card such as, for example, a credit card or a debit card. In one embodiment of the invention, the card scanner 114 may be configured to transmit information read from a bank card to the server 102 for verification of bank card data. The verification of bank card data is described in greater detail below.

The server 102 may be a server maintained by a financial institution such as, for example, an institution that has issued bank cards to consumers making a purchase at the merchant location. The server 102 may be configured to receive bank card data from the merchant computer 101 and determine whether or not a purchase made by a person using an issued bank card should be approved.

The server 102 may by physically arranged in a manner similar to the client computer 101. Accordingly, the server 102 is shown generally comprising at least one CPU 121, memory 122, and a storage device 126, coupled with one another by a bus 130. Memory 122 may be a random access memory sufficiently large to hold the necessary programming and data structures that are located on server 102.

The server 102 may generally be under the control of one or more operating systems 123 shown residing in memory 122. Exemplary operating systems 123 include IBM OS/400®, UNIX, Microsoft Windows®, and the like. More generally, any operating system capable of supporting the functions described herein may be used.

The memory 122 further includes a verification program 124. The verification program 124 may be a software product comprising a plurality of instructions that are resident at various times in various memory and storage devices in the computer system 100. When read and executed by one or more processors 121 in the server 102, the verification program 124 may cause the computer system 100 to perform the steps necessary to execute steps or elements embodying the various aspects of the invention.

For example, the verification program 124 may receive bank card data sent by the card scanner 114 of a merchant computer 101. The bank card data may include, for example, consumer name, transaction data such as items to be purchased, purchase price, bank card number, bank card account number, bank card expiration date, and the like. In response to receiving the bank card data the verification program may determine whether the transaction should be approved. For example, the verification program may determine whether the bank card has expired, whether the purchase will result in exceeding a credit limit of the consumer, an available balance, and the like. If it is determined that the transaction can be approved, the verification program 124 may send a notification to the merchant computer 101 approving the transaction, thereby completing payment for the goods and/or services bought by a consumer. In one embodiment, the verification program 124 may be configured to determine whether a person using the bank card is a person authorized to use the bank card prior to authorizing the purchase, as will be discussed in greater detail below.

Storage 126 may include user profiles 127 and bank card account data 128. User profiles 126 may be profiles associated with consumers to whom the financial institution operating the server 102 has issued bank cards. The user profiles may include consumer preferences regarding security verification of consumer transactions, as will be discussed in greater detail below. Bank card account data 128 may be data regarding a consumer's account for example, consumer name, current balance, expiration date of bank cards, available credit limits, transaction history, account numbers, and the like. The bank card account data 128 may be accessed by the verification program 124 and compared to bank card data received from a merchant computer 101 in order to determine whether a purchase should be authorized.

The mobile device 103 may be any device owned and operated by a consumer making a purchase at the merchant location. Exemplary mobile devices may include laptops, desktops, game stations, personal digital assistants (PDAs), cellular phones, and the like. In a particular embodiment, the mobile device 103 may be a cellular phone.

The mobile device 103 may also be physically arranged in a manner similar to the client computer 101 and server 102. Accordingly, the mobile device 103 is shown generally comprising at least one CPU 141, and a memory 142, coupled with one another by a bus 140. Memory 122 may be a random access memory sufficiently large to hold the necessary programming and data structures that are located on the mobile device 103.

The memory 142 also includes one or more applications 144. The applications 144 may be software products comprising a plurality of instructions that are resident at various times in various memory locations in the mobile device 103. When read and executed by the CPU 141, applications 144 may cause the mobile device 144 to perform the steps necessary for operating the mobile device 103. For example, in a cellular phone, the applications 144 may support text messaging, position tracking using, for example, global positioning satellite (GPS) location tracking, access security features, and the like.

As illustrated in FIG. 1, the mobile device 103 may be coupled with the server 102 via the network 191. Upon receiving bank card data from a merchant computer 101, the verification program 124 of the server 102 may be configured to communicate with the mobile device 103 to verify a purchase at the merchant computer 101, as will be discussed below.

Security Verification of Bank Cards

Traditional bank card verification process has generally involved electronically providing the bank card data to a financial institution by a merchant, which generally approves use of the card based on, for example, the expiration date of the card and available credit limit. In some cases, the bank card data may include a Credit Card Verification (CCV) code that is provided on a magnetic stripe bank card issued to a consumer.

However, the bank card data can be easily obtained by an identity thief. For example, a bank card may be stolen from a rightful owner and used at a merchant location. Because the CCV code is present on the card, it may be retrieved by the identity thief by simply viewing the information on the bank card. Therefore, the identity thief may easily complete an unauthorized purchase using a stolen bank card. While there may be remedies available to a consumer or financial institution to recover for a loss after an unauthorized purchase, the traditional verification scheme does not provide any means for stopping bank card fraud before it happens.

Embodiments of the invention provide a means for verifying that a person using a bank card at a point-of-sale merchant location is in fact a person authorized to use the bank card. In one embodiment of the invention, verification may involve communicating with the mobile device 103 associated with a person authorized to use the bank card. The person authorized to use the bank card may be required to submit and send verification data to the bank card verification system via the mobile device to confirm a purchase. For example, in one embodiment, the user of the mobile device may be prompted to enter a security code. The bank card verification system may not authorize the purchase if the proper verification data is not received from the mobile device. In another embodiment, the bank card verification system may be configured to determine a proximity of the mobile device to the merchant point-of-sale location to verify the purchase.

Figure 2:
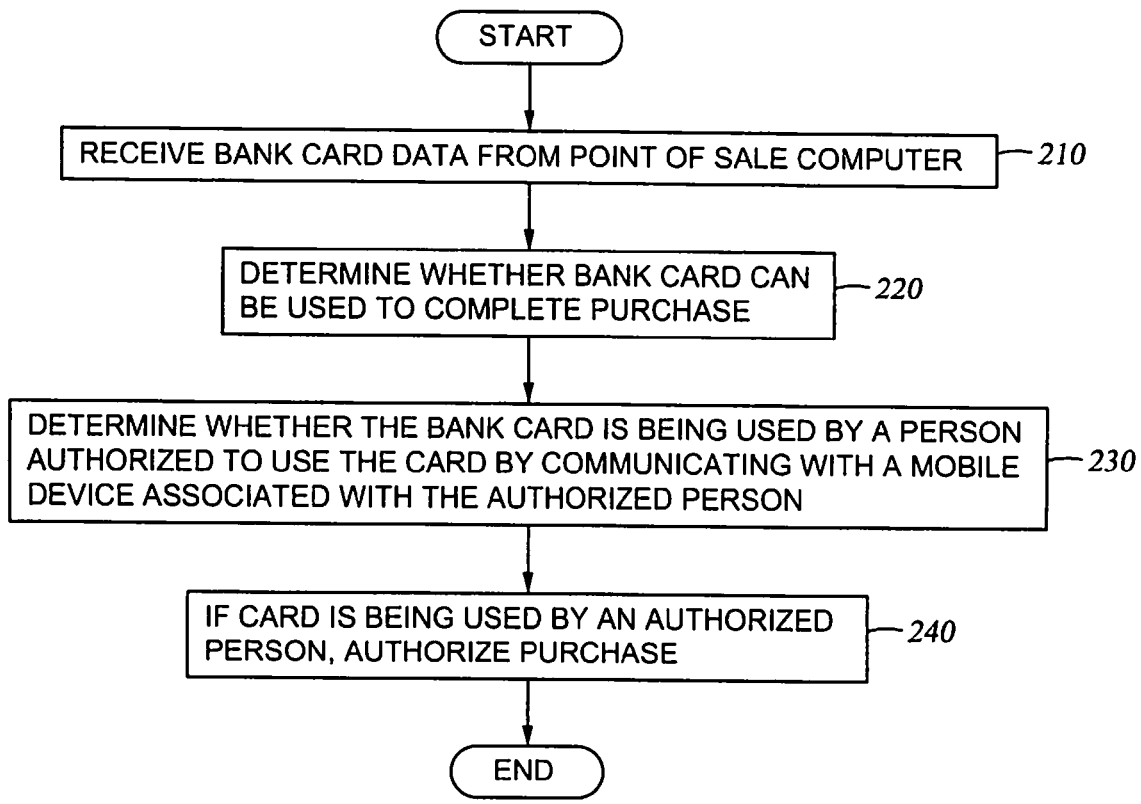
FIG. 2 is a flow diagram of exemplary operation performed by a server to authorize a purchase made with a bank card, according to an embodiment of the invention.

FIG. 2 is a flow diagram of exemplary operations performed by the verification program 124 to verify that a bank card is being used by a person authorized to use the bank card. The operations may begin in step 210 by receiving bank card data from a merchant point-of-sale computer 101 over a network, for example, the network 190 illustrated in FIG. 1. The bank card data may be sent to the verification program 124 of server 102 when a bank card is swiped at a card scanner 114 of a merchant computer 101. Illustratively, the bank card data may include data read from a magnetic stripe of the bank card, for example, consumer name, expiration date of the card, card number, bank card account number, purchased items, purchase price, a debit card PIN number, CCV code, and the like. The bank card may have been swiped at the card scanner 114 by (or at the direction of) a consumer in order to pay the merchant for desired goods and services. Therefore, the bank card data may indicate that a purchase using the bank card is being attempted.

In step 220, the verification program 124 may determine whether the bank card can be used to complete the purchase. For example, the verification program may access the bank card account data 128 in storage device 126 to determine whether the card is associated with an active consumer account. If the bank card is a credit card, the verification program 124 may determine whether there is available credit for the purchase. Alternatively, if the bank card is a debit card, the verification program 124 may determine whether there are sufficient funds in the consumer's account to pay for the purchase.

In step 230, the verification program may determine whether the bank card is being used by a person authorized to use the bank card by communicating with a mobile device 103 associated with the person authorized to use the bank card. The communication may involve prompting a user of the mobile device for verification data. The particular method and means for communication, verification data, and the like may be established by the consumer in the user profiles 127, according to one embodiment. Therefore, the verification program 124 may be configured to access the user profiles to determine, for example, a type of the mobile device (and more particularly, the communication capabilities of the device), a type of communication to send to the mobile device, and the like, based on the user profiles 127.

In one embodiment, the mobile device 103 may be a cellular phone. Therefore, the verification program 124 may be configured to access user profiles 127 or bank card account data 128 to retrieve a phone number for the person associated with the bank card. In one embodiment, the verification program 124 may place a call to the cellular phone 103 via the network 191 and prompt the consumer for a security response. The security response may include verification data for example, a security code that may be entered or spoken into the cellular phone and transmitted to the verification program 124. In another embodiment of the invention, the verification program 124 may be configured to send a text message to a cellular phone 103. The text message may prompt the consumer to respond to the text message with the security code. In still another embodiment, the cellular phone may be configured with an email client capable of sending and receiving emails. In this case, the verification program 124 may be configured to send an email to a cellular phone. The consumer may then respond via a reply email, a voice message or a text message, for example.

In one embodiment of the invention, the mobile device 103 may be a laptop computer or a personal digital assistant (PDA). Accordingly, the verification program 124 may be configured to send the laptop 103 an email, instant message, or like communication prompting the consumer for the security code. Embodiments of the invention are not limited to the mobile devices 103 described hereinabove. More generally any type of mobile device, and any type of communication prompting a user of the mobile device for the verification data fall within the purview of the invention.

In one embodiment, verification program 124 may compare the received verification data by comparing it to predefined verification data stored in the user profiles 127 or bank card account data 128. If the security code provided via the mobile device 103 matches the predefined verification data stored in the storage device 126, verification program 124 may be configured to send a message to the merchant computer 101 authorizing the purchase, in step 240.

By communicating with a person authorized to use a bank card via the mobile device 103 prior to authorizing a bank card purchase, embodiments of the invention may provide greater security against identity theft and bank card fraud. For example, if an identity thief were to steal a bank card and use the bank card at a merchant location, the verification program 124 would immediately contact the bank card owner authorized to use the card, thereby notifying the owner of unauthorized activity on the bank card. The owner may therefore refuse to enter the security code, thereby preventing the unauthorized purchase from taking place. Alternatively, the owner may enter a different code indicating unauthorized activity.

If the use of the bank card is not authorized via the mobile device 103, verification program 124 may not send the authorization message to the merchant computer 101. Alternatively, the verification program may send a message indicating a rejection of the purchase or a message indicating illegal activity to the merchant computer 101 or to the merchant (which may prompt the merchant to confiscate the card). In one embodiment of the invention, the communications between the verification program 124, mobile device 103, and merchant computer 101 may be encrypted to provide further security. Any suitable encryption technology may be used to encrypt the communications.

In some embodiments, the verification system described hereinabove may be adapted for use by a first person authorized to use the bank card to control and monitor the behavior of a second person authorized to use the card. For example, a parent may want to monitor credit card use of his teenage daughter. Another example is that of a corporation that may want to control the use of a corporate card by an employee. Accordingly, each time a bank card is used by the second person (e.g. teenage daughter or corporate employee), the first person (parent or corporate manager) may receive communication from the verification program 124 on a mobile computer 103 to authorize the purchase made with the bank card.

Figure 3:
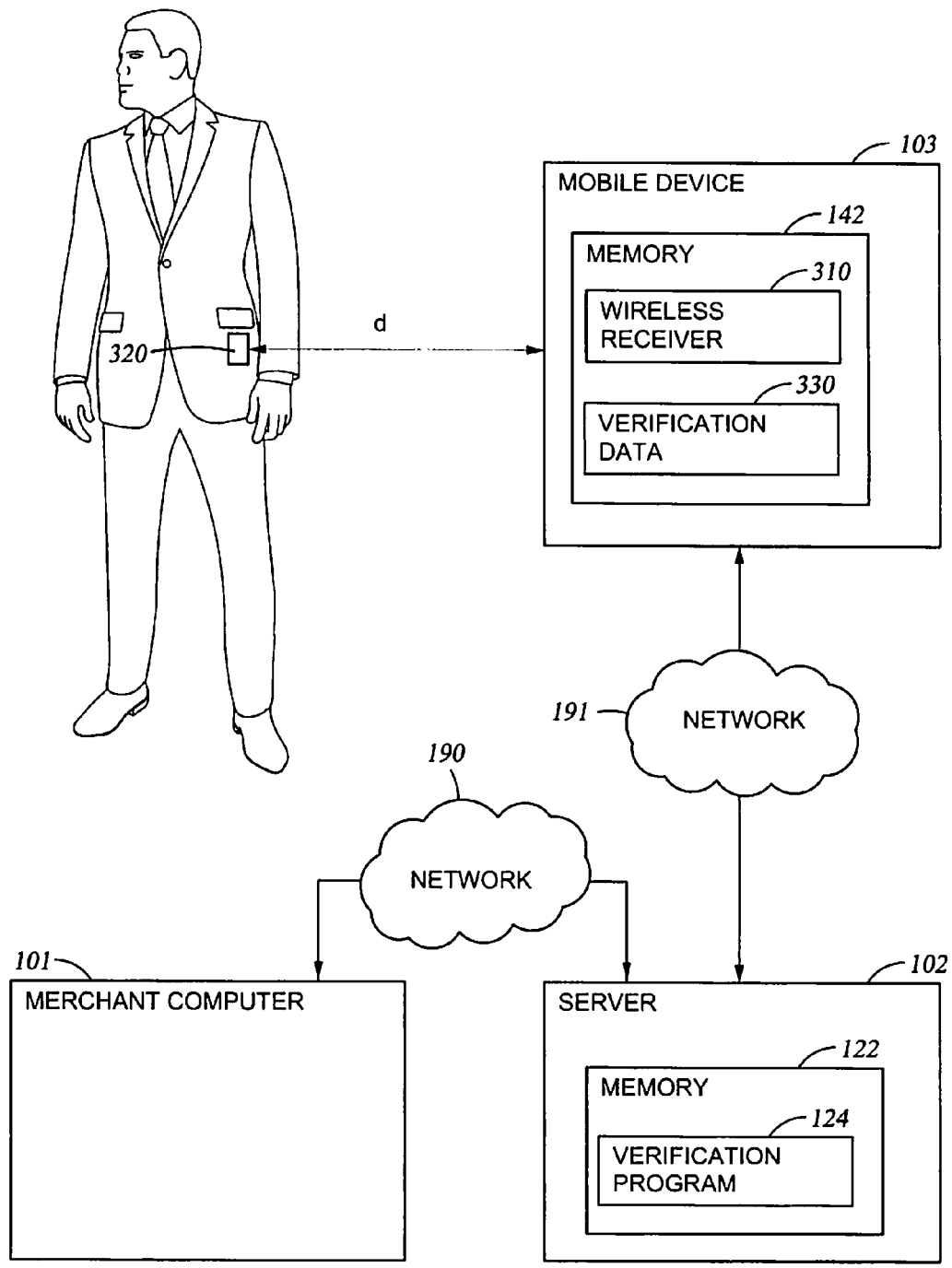
FIG. 3 illustrates another exemplary system according to an embodiment of the invention.

FIG. 3 illustrates another exemplary system 300 according to an embodiment of the invention. System 300 may be similar to system 100 illustrated in FIG. 1, and may include a merchant computer 101 and a mobile device 103 coupled with a server 102 via networks 190 and 191 respectively. Server 102 may include a memory 122 including a verification program 124. The mobile device 103 may include a memory 142 including a wireless receiver 310 and verification data 330. While the wireless receiver 310 is shown as a part of the memory 142, in alternative embodiments, the wireless receiver may be implemented as a hardware device, for example, a Radio Frequency Identification (RFID) device.

In one embodiment of the invention, wireless receiver 310 of the mobile device 103 illustrated in FIG. 3 may be configured to automatically respond to communication received from the verification program 124. For example, in response to being prompted for verification data, the wireless receiver 310 may be configured to automatically respond to the verification program 124 with the verification data 330, without user input. In a particular embodiment, the response of the mobile device 103 may depend on a distance between the mobile device 103 and a banking card 320. For example, in one embodiment, the bank card 320 may be equipped with a wireless identification key configured to emit a wireless signal. The wireless receiver 310 may receive the wireless signal and estimate a distance d between the bank card 320 and the mobile device 103.

In one embodiment of the invention, the mobile device 103 may be configured to automatically respond to the verification program 124 with the verification data 330 only if the bank card 320 is within a predefined distance from the mobile device 103. If the bank card 320 is not within the predefined distance, the mobile device may not respond, or alternatively, may indicate that a purchase being made with the bank card is not authorized, or that the bank card was not found within the predefined distance.

It is likely that a mobile device such as, for example, a cellular phone will generally be carried on one's person. Therefore, by verifying that a bank card is within a predefined distance from the mobile device 103, embodiments of the invention may verify that the bank card 320 is indeed with a person authorized to use the bank card, i.e., the person having the mobile device.

In one embodiment, if the bank card 320 is not found within the predefined distance, the wireless receiver 310 may be configured to prompt a user of the mobile device 103 for the verification data. Therefore, the purchase may be verified even if the bank card 320 is not within the predefined distance. In an alternate embodiment, if the verification program 124 does not receive an automatic response from the wireless receiver 310, or if a response indicating that the card was not found within the predefined proximity is received, the verification program 124 may be configured to use an alternate method for receiving verification data for example, a phone call, text message, instant message, or the like, which require manual input of the verification data.

In an alternative embodiment, the mobile device 103 may include facial scanning and recognition software installed therein. Accordingly, if the bank card is not present within the predefined distance, the person authorized to use the bank card may initiate a scan of his face. If the facial scan indicates that the user is a person authorized to use the bank card, the mobile device 103 may respond to the verification program 124 with the verification data. In some embodiments of the invention, a retinal scan may be performed using the mobile device 103, instead of a facial scan. More generally, any other method for recognizing a person that is authorized to use the bank card, for example, fingerprint scanning and recognition, voice recognition, and the like may be used.

In some embodiments, in response to receiving a request for the verification data, the receiver 310 may be configured to prompt the user to initiate a recognition scan, for example, a facial, retinal, voice, or fingerprint scan. If the scan indicates that the person is the person authorized to use the bank card, the receiver 310 may be configured to automatically provide the verification data, or other suitable response, to the verification program 124, thereby indicating that the purchase can be authorized.

Figure 4:
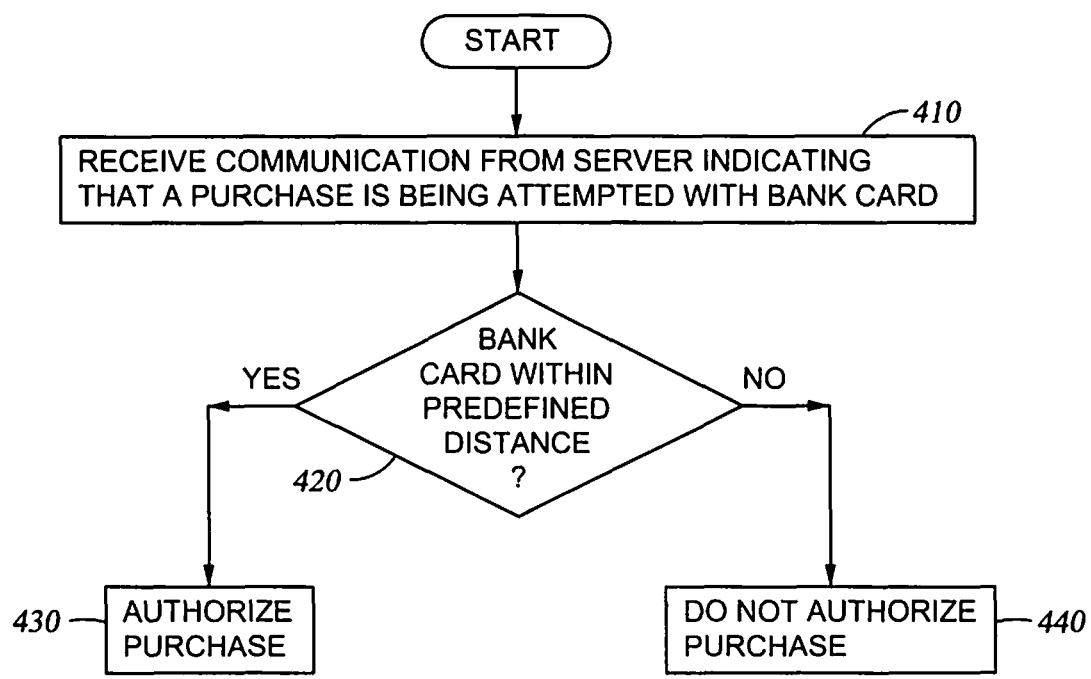
FIG. 4 is a flow diagram of exemplary operations performed by a mobile device while communicating with a server to authorize a purchase made with a back card, according to an embodiment of the invention.

FIG. 4 illustrates exemplary operations performed by the wireless receiver 310 according to an embodiment of the invention. The operations may begin in step 410 by receiving communication from a verification program 124 of server 102. The communication may indicate that a purchase is being attempted with a bank card 320. In response to receiving the communication from the verification program 124, wireless receiver 310 may determine whether the bank card 320 is within a predefined proximity in step 420. For example, the bank card 320 may emit a wireless signal, which may be received by the wireless receiver 310. Wireless receiver 310 may estimate a distance d between the bank card 320 and the mobile device 103 based on the received signal.

If the bank card 320 is determined to be within the predefined proximity, the wireless receiver may automatically respond to the verification program 124 with the verification data 330, in step 430. On the other hand, if the bank card 320 is not within the predefined distance, in step 440, the wireless receiver 310 may be configured to indicate that the bank card 320 is not within the predefined distance, i.e. that the purchase is not authorized.

GPS Based Security Verification

Figure 5:
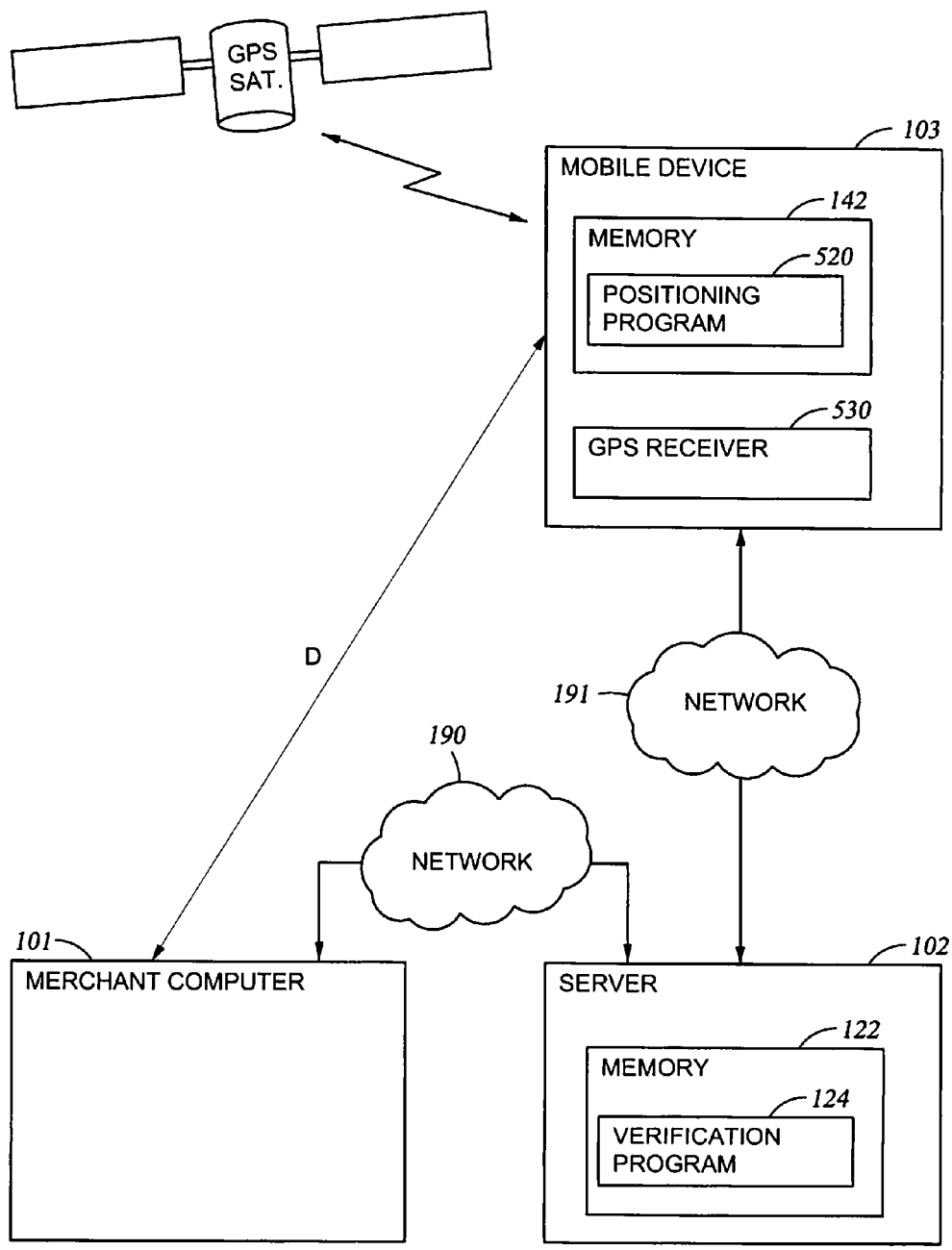
FIG. 5 illustrates yet another system according to an embodiment of the invention.

FIG. 5 illustrates yet another system 500, according to an embodiment of the invention. System 500 may include a merchant computer 101 and mobile device 103 coupled with a server 102 via networks 190 and 191 respectively, as illustrated in FIG. 5. System 100 may also include a Global Positioning Satellite (GPS) 510 that may be configured to communicate with the mobile device 103 to determine a location of the mobile device 103. Server 102 may include a memory 102 including a verification program 124, as illustrated.

Mobile device 103 may include a memory 142 and a GPS receiver 530. GPS receiver 530 may be configured to receive a signal from the GPS satellite 510. For example, in one embodiment, the GPS signal may be a microwave signal comprising a position of the satellite within a predefined orbit. The GPS receiver 530 may be configured to transfer the GPS signal to a positioning program 520 in memory 142. Positioning program 520 may be configured to determine a location of the mobile device 103 on a surface of the earth based on the GPS signal received from the GPS satellite 510.

In one embodiment of the invention, verification program 124 may be configured to communicate with the mobile device 103 to determine a location of the mobile device 103 in response to receiving bank card data from a merchant computer. For example, in one embodiment, the verification program 124 may send a message to the mobile device 103 indicating that a purchase is being attempted with a bank card. In response to receiving the message from the verification program 124, the positioning program 520 of the mobile device 103 may be configured to automatically respond to the verification program 124 by providing the position of the mobile device 103.

In one embodiment, verification program 124 may be configured to use the position data received from the mobile device 103 to determine a distance D between the mobile device 103 and a merchant location (where merchant computer 101 is located). The merchant location data may have been provided to the verification program 124 as a part of the bank card data transmitted from merchant computer 101 to the server 102.

In one embodiment, if the mobile device 103 is not within a predefined distance from the merchant location, the verification program 124 may not authorize the purchase. In other words, it is likely that a person authorized to use a bank card is carrying the mobile device 103, for example a cellular phone, on his person. Therefore, by determining the location of the mobile device 103, and its proximity to the merchant location, verification program 124 may determine whether the person using the bank card at the merchant location is indeed the person authorized to use the bank card.

In an alternative embodiment, the verification program 124 may send merchant location data to the mobile device 103. The mobile device 103 may communicate with the GPS satellite 510 to determine its position with respect to the merchant location. For example, the positioning program 520 may determine a distance between the mobile device 103 and the merchant location. The mobile device may send a security response, for example, a security code, to the verification program 124 based on the distance between the mobile device and the merchant location. For example, if the mobile device 103 is within a predefined distance from the merchant location, positioning program 520 may send a security response indicating authorization of the purchase.

Figure 6:
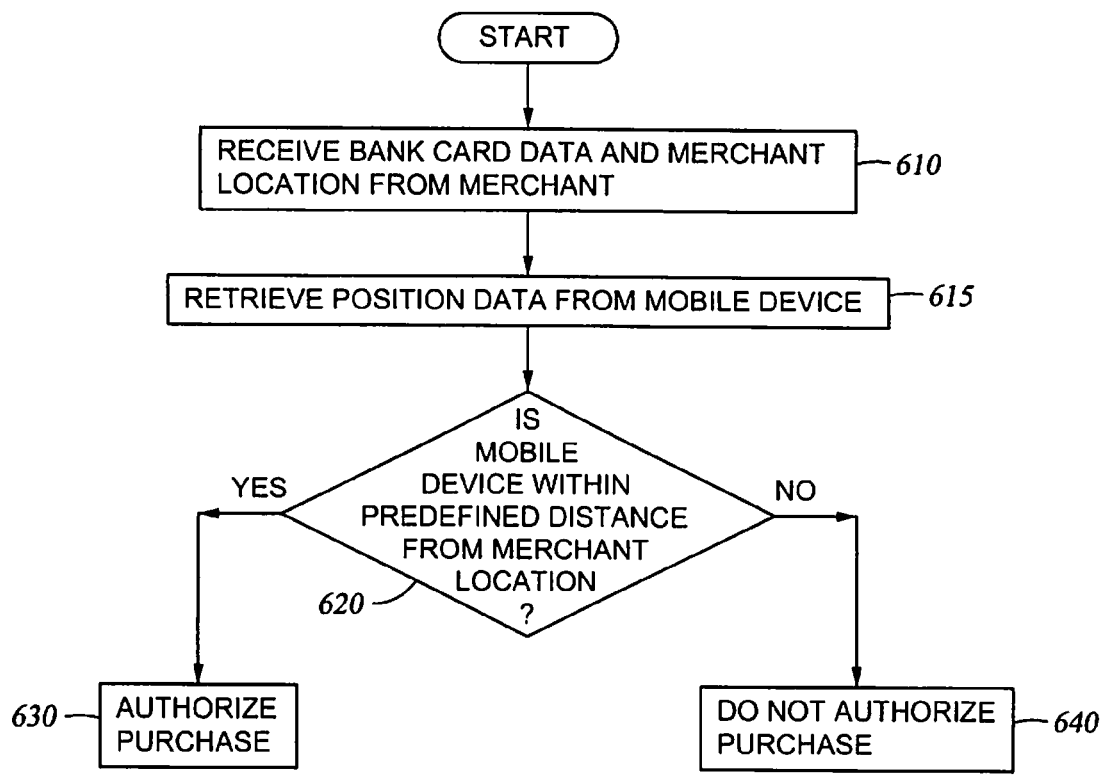
FIG. 6 is another flow diagram of exemplary operation performed by a server to authorize a purchase made with a bank card, according to an embodiment of the invention.

FIG. 6 is a flow diagram of exemplary operations performed by the verification program 124 to verify a purchase, according to an embodiment of the invention. The operations may begin in step 610 by receiving bank card data from a merchant computer 101. In one embodiment of the invention, the bank card data may include a location or address of the merchant, for example, a location of the merchant computer 101.

In step 620, the verification program 124 may communicate with the mobile device 103 to retrieve position data indicating a position data of the mobile device 103. In step 630, the verification program 124 may determine whether the mobile device 103 is within a predefined distance from the merchant location. If the mobile device 103 is within the predefined distance, in step 640, the verification program 124 may authorize the purchase. On the other hand, if the mobile device 103 is not within the predefined distance, the verification program 124 may not authorize the purchase, in step 650.

While tracking locations of the mobile computer 103 using GPS technology is disclosed hereinabove, in alternative embodiments, any other suitable positional tracking technology, for example, triangulation, may be used to track mobile computer location.

CONCLUSION

By communication with a mobile device belonging to a person authorized to use a bank card, embodiments of the invention allow verification that a person using the bank card is indeed the person authorized to use the bank card, thereby preventing bank card fraud and identity theft.

While the foregoing is directed to embodiments of the present invention, other and further embodiments of the invention may be devised without departing from the basic scope thereof, and the scope thereof is determined by the claims that follow.

What is claimed is:

1. A method for authorizing purchases made with a bank card using a mobile device, comprising:
receiving a request for a security response, wherein the request is received in response to an attempt to use the bank card to complete a purchase; and
in response to the request for a security response:
determining, by operation of one or more computer processors, whether the bank card is within a predefined distance from the mobile device estimating a distance between the bank card and the mobile device based on a signal exchanged between the mobile device and circuitry within the bank card;
providing a first security response to authorize the purchase upon determining that the bank card is within the predefined distance from the mobile device; and
providing a second security response to reject the purchase upon determining that the bank card is not within the predefined distance from the mobile device.

2. The method of claim 1, wherein providing the first security response comprises providing a first security code to authorize the purchase, and providing the second security response comprises providing a second security code to reject the purchase.

3. The method of claim 1, wherein providing the first security response comprises performing a scan of a user of the mobile device using a bio sensor.

4. The method of claim 3, wherein the scan comprises any one of:
a fingerprint scan;
facial scan; and
retinal scan.

5. The method of claim 1, further comprising:
determining whether the mobile device is within a predefined distance from a location where the purchase is being attempted;
providing the first security response upon determining that the mobile device is within the predefined distance from the location; and
providing the second security response upon determining that the mobile device is not within the predefined distance from the location.

6. The method of claim 1, wherein the bank card is one of a credit card and a debit card.

7. The method of claim 1, wherein the mobile device is a cellular phone.

8. A computer readable storage medium comprising a program product, which, when executed by a processor is configured to perform an operation for authorizing purchases made with a bank card using a mobile device, comprising:

receiving a request for a security response, wherein the request is received in response to an attempt to use the bank card to complete a purchase; and in response to the request for a security response:

determining whether the bank card is within a predefined distance from the mobile device by estimating a distance between the bank card and the mobile device based on a signal exchanged between the mobile device and circuitry within the bank card;

providing a first security response to authorize the purchase upon determining that the bank card is within the predefined distance from the mobile device; and providing a second security response to reject the purchase upon determining that the bank card is not within the predefined distance from the mobile device.

9. The computer readable storage medium of claim 8, wherein providing the first security response comprises providing a first security code to authorize the purchase, and providing the second security response comprises providing a second security code to reject the purchase.

10. The computer readable storage medium of claim 8, wherein providing the first security response comprises performing a scan of a user of the mobile device using a bio sensor.

11. The computer readable storage medium of claim 10, wherein the scan comprises any one of:
    a fingerprint scan;
    facial scan; and
    retinal scan.

12. The computer readable storage medium of claim 8, wherein the operation further comprises:
    determining whether the mobile device is within a predefined distance from a location where the purchase is being attempted;
    providing the first security response upon determining that the mobile device is within the predefined distance from the location; and
    providing the second security response upon determining that the mobile device is not within the predefined distance from the location.

13. The computer readable storage medium of claim 8, wherein the mobile device is a cellular phone.

14. The computer readable storage medium of claim 8, wherein the bank card is one of a credit card and a debit card.

15. A system, comprising at least one server, and at least one mobile device associated with a person authorized to use a bank card, wherein the mobile device is configured to:

receive a request for a security response from the server, wherein the request is received in response to an attempt to use the bank card to complete a purchase; and in response to the request for the security response:

determine whether the bank card is within a predefined distance from the mobile device by estimating a distance between the bank card and the mobile device based on a signal exchanged between the mobile device and circuitry within the bank card;

provide a first security response to the server to authorize the purchase upon determining that the bank card is within the predefined distance from the mobile device; and provide a second security response to the server to reject the purchase upon determining that the bank card is not within the predefined distance from the mobile device.

16. The system of claim 15, wherein the mobile device is configured to provide the first security response by providing a first security code to authorize the purchase, and providing the second security response comprises providing a second security code to reject the purchase.

17. The system of claim 15, wherein the mobile device is configured to provide the first security response by performing a scan of a user of the mobile device using a bio sensor.

18. The system of claim 17, wherein the scan comprises any one of:
    a fingerprint scan;
    facial scan; and
    retinal scan.

19. The system of claim 15, wherein the mobile device is configured to:
    determine whether the mobile device is within a predefined distance from a location where the purchase is being attempted;
    provide the first security response upon determining that the mobile device is within the predefined distance from the location; and
    provide the second security response upon determining that the mobile device is not within the predefined distance from the location.

20. The system of claim 15, wherein the mobile device is a cellular phone.

21. The system of claim 15, wherein the bank card comprises a radio frequency emitter and the mobile device comprises a radio frequency detector, wherein the radio frequency detector is configured to determine a distance between the bank card and the mobile device based on radio signals received from the emitter.

\* \* \* \* \*